United States Patent
Lee

(10) Patent No.: US 7,591,018 B1
(45) Date of Patent: Sep. 15, 2009

(54) PORTABLE ANTIVIRUS DEVICE WITH SOLID STATE MEMORY

(75) Inventor: Andrew Lee, Atlanta, GA (US)

(73) Assignee: Trend Micro Incorporated, Tokyo (JP)

( * ) Notice: Subject to any disclaimer, the term of this patent is extended or adjusted under 35 U.S.C. 154(b) by 757 days.

(21) Appl. No.: 10/940,319

(22) Filed: Sep. 14, 2004

(51) Int. Cl.
*G06F 11/00* (2006.01)
*G06F 12/14* (2006.01)
*G06F 12/16* (2006.01)
*G08B 23/00* (2006.01)

(52) U.S. Cl. ...................................................... 726/24
(58) Field of Classification Search .................. 726/24; 713/192
See application file for complete search history.

(56) References Cited

U.S. PATENT DOCUMENTS

| | | | | |
|---|---|---|---|---|
| 4,725,992 A * | 2/1988 | McNatt et al. | ................. | 367/77 |
| 5,469,573 A * | 11/1995 | McGill et al. | ................ | 717/127 |
| 5,559,960 A * | 9/1996 | Lettvin | ......................... | 726/24 |
| 5,826,013 A * | 10/1998 | Nachenberg | .................. | 726/22 |
| 5,918,008 A * | 6/1999 | Togawa et al. | .................. | 726/24 |
| 6,016,553 A | 1/2000 | Schneider et al. | | |
| 6,035,423 A * | 3/2000 | Hodges et al. | .................. | 714/38 |
| 6,128,734 A * | 10/2000 | Gross et al. | .................. | 713/100 |
| 6,170,055 B1 * | 1/2001 | Meyer et al. | .................... | 713/2 |
| 6,230,285 B1 * | 5/2001 | Sadowsky et al. | ............. | 714/14 |
| 6,260,172 B1 * | 7/2001 | Hazama | ....................... | 714/773 |
| 6,269,456 B1 * | 7/2001 | Hodges et al. | ................. | 714/38 |
| 6,317,845 B1 * | 11/2001 | Meyer et al. | ................... | 714/23 |
| 6,327,579 B1 * | 12/2001 | Crawford | ..................... | 705/400 |
| 6,347,375 B1 * | 2/2002 | Reinert et al. | .................. | 726/24 |
| 6,438,749 B1 * | 8/2002 | Chamberlain | ................ | 717/174 |
| 6,633,977 B1 * | 10/2003 | Hamilton et al. | ............. | 713/100 |
| 6,715,067 B1 * | 3/2004 | Rhoads et al. | .................. | 713/1 |
| 6,732,301 B1 * | 5/2004 | Landry et al. | ................. | 714/43 |
| 6,813,725 B1 * | 11/2004 | Hanes et al. | .................... | 714/2 |
| 6,920,553 B1 * | 7/2005 | Poisner | .......................... | 713/2 |
| 6,993,649 B2 * | 1/2006 | Hensley | .......................... | 713/2 |
| 7,020,895 B2 * | 3/2006 | Albrecht | ....................... | 726/22 |
| 7,073,013 B2 * | 7/2006 | Lasser | .......................... | 711/102 |
| 7,096,501 B2 * | 8/2006 | Kouznetsov et al. | .......... | 726/24 |
| 7,127,531 B2 * | 10/2006 | Biggs et al. | ..................... | 710/5 |
| 7,213,766 B2 * | 5/2007 | Ryan et al. | ................... | 235/492 |
| 7,293,166 B2 * | 11/2007 | Nguyen et al. | .................. | 713/1 |
| 7,305,709 B1 * | 12/2007 | Lymer et al. | ................... | 726/25 |
| 7,340,774 B2 * | 3/2008 | Hursey et al. | .................. | 726/22 |
| 7,441,108 B2 * | 10/2008 | Fisher et al. | ................. | 712/227 |
| 2001/0005889 A1 * | 6/2001 | Albrecht | ....................... | 713/201 |
| 2002/0049883 A1 | 4/2002 | Schneider et al. | | |
| 2003/0221095 A1 | 11/2003 | Gaunt et al. | | |
| 2004/0095382 A1 * | 5/2004 | Fisher et al. | ................. | 345/744 |
| 2004/0117610 A1 * | 6/2004 | Hensley | .......................... | 713/2 |
| 2004/0158699 A1 * | 8/2004 | Rhoads et al. | .................. | 713/1 |
| 2004/0210645 A1 * | 10/2004 | Kouznetsov et al. | ......... | 709/220 |
| 2004/0236874 A1 * | 11/2004 | Largman et al. | ............... | 710/8 |
| 2005/0022014 A1 * | 1/2005 | Shipman | ..................... | 713/201 |
| 2005/0039076 A1 * | 2/2005 | Shoam | ......................... | 714/20 |
| 2005/0102471 A1 * | 5/2005 | Tsai et al. | .................... | 711/115 |

(Continued)

*Primary Examiner*—David Garcia Cervetti
(74) *Attorney, Agent, or Firm*—Okamoto & Benedicto LLP

(57) ABSTRACT

In one embodiment, a rescue device is employed to disinfect a computer infected with a virus. The rescue device may comprise solid state memory. The rescue device may be removable from the computer and reusable for update and/or upgrade over a computer network. The rescue device may comprise a bootable partition, a virus scanning engine and a virus pattern file.

13 Claims, 4 Drawing Sheets

U.S. PATENT DOCUMENTS

| | | | |
|---|---|---|---|
| 2005/0109841 A1* | 5/2005 | Ryan et al. | 235/380 |
| 2005/0120242 A1* | 6/2005 | Mayer et al. | 713/201 |
| 2005/0193188 A1* | 9/2005 | Huang | 713/1 |
| 2005/0198485 A1* | 9/2005 | Nguyen et al. | 713/1 |
| 2005/0262334 A1* | 11/2005 | Scudder | 713/1 |
| 2005/0278544 A1* | 12/2005 | Baxter | 713/182 |
| 2006/0072527 A1* | 4/2006 | Beck et al. | 370/338 |
| 2006/0075486 A1* | 4/2006 | Lin et al. | 726/20 |
| 2006/0208066 A1* | 9/2006 | Finn et al. | 235/380 |
| 2006/0236398 A1* | 10/2006 | Trakic et al. | 726/24 |
| 2006/0265749 A1* | 11/2006 | Kwon et al. | 726/24 |
| 2007/0261118 A1* | 11/2007 | Lu | 726/24 |
| 2008/0082813 A1* | 4/2008 | Chow et al. | 713/2 |
| 2008/0162915 A1* | 7/2008 | Price et al. | 713/2 |
| 2008/0244743 A1* | 10/2008 | Largman et al. | 726/23 |

\* cited by examiner

PORTABLE ANTIVIRUS DEVICE WITH SOLID STATE MEMORY

BACKGROUND OF INVENTION

1. Field of the Invention

The present invention relates generally to computer virus detection and removal, and more particularly but not exclusively to a portable antivirus rescue device.

2. Description of the Background Art

The threat posed by computer viruses and worms to computer systems is well documented. A computer virus comprises malicious code that may be buried or hidden in another program and may attach itself to other programs in the system. A computer virus code can corrupt or delete important files, send e-mails without user authorization, render a computer inoperable, or cause other types of damage to a computer. Computer worms are destructive programs that replicate themselves and use up computer resources, eventually causing the computer system to crash. Hereinafter, for simplicity, the term "virus" refers to computer viruses, worms, and other malicious programs.

From the old Disk Operating System (DOS) battlefield to the current Windows 32-bit (Win32) arena, the evolving virus technology has taken the battle between virus writers and antivirus experts to greater heights. A virus may be designed to corrupt one of the bootstrap files of an operating system, which may prevent the computer from booting properly. For example, the DOS™ operating system may include bootstrap files, such as IO.SYS, MSDOS.SYS and COMMAND.COM, which may be loaded into a computer main memory (RAM) during the booting process. If one or more of these files are infected by a virus, the computer may not boot properly, and as a consequence, the user cannot start any application program. Another example may be the WINDOWS™ operating system that may have the "safe mode" as a booting option. Safe mode is a maintenance mode where only the bare minimum of files is loaded. As in the case of DOS™ operating system, WINDOWS™ operating system would not boot properly if one or more of the minimum files are infected by a virus.

One solution for scanning for viruses may be getting help over the Internet, such as downloading an available antivirus program. However, this solution may not be an option for a computer that has an infected booting and/or operating system. This is because infected booting and/or operating system may prevent the computer from booting up in the first place or prevent the computer from connecting to the Internet to get an antivirus program. Also, the user may not be able to install an antivirus program since the computer may have problems in running drivers required for installing any program. Even experienced and sophisticated computer users may have difficulty scanning for such viruses since, in addition to the complexity of viruses, new types of viruses not recognized by existing antivirus programs are continuously generated by clever virus coders.

In addition, existing antivirus mechanisms may be hard to use and may not be able to scan fast evolving viruses in an efficient and user-friendly manner. A frustrated user may choose to reinstall the entire operating system instead of scanning for viruses. However, in that case, the user may lose all of the valuable information and contents stored in the infected system during the reinstallation process, which translates to lost time, money and effort.

SUMMARY

In one embodiment, a rescue device is employed to disinfect a computer infected with a virus. The rescue device may comprise solid state memory. The rescue device may be removable from the computer and reusable for update and/or upgrade over a computer network. The rescue device may comprise a bootable partition, a virus scanning engine and a virus pattern file.

These and other features of the present invention will be readily apparent to persons of ordinary skill in the art upon reading the entirety of this disclosure, which includes the accompanying drawings and claims.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific detail. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable code for performing the function of a particular component. Likewise, computer memory may be configured to include one or more components, which may then be executed by a processor. Components may be implemented separately in multiple modules or together in a single module.

The present invention relates to a removable rescue device and method to scan a computer infected with a virus. The rescue device is relatively easy to use even for inexperienced computer users. Unlike conventional rescue mechanisms, the rescue device may boot and scan virus-infected computers without reformatting them. Another advantage of the rescue device is that it can be reused for update and/or upgrade through a network. For example, a user can update the rescue device through the Internet using any computer connected thereto and download updated files required for scanning new types of viruses not recognizable by existing antivirus programs. Still another advantage is that the device may be designed to have a form factor for easy purchase and an enhanced robustness by using solid-state memory, such as universal serial bus (USB) memory.

Figure 1:
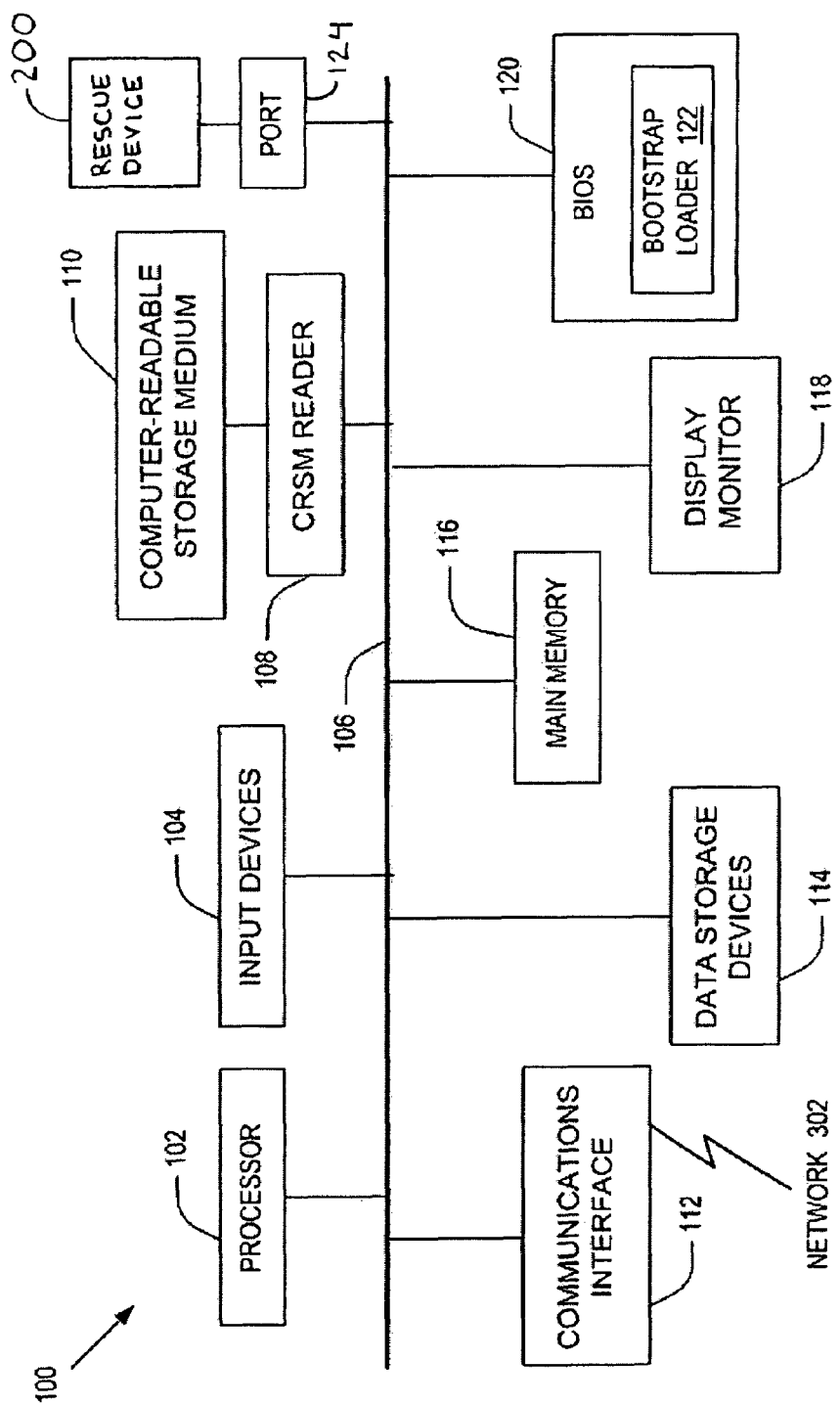
FIG. 1 shows a schematic diagram of an example computer that may use the embodiments of the present invention.

Referring now to FIG. 1, there is shown a schematic diagram of an example computer 100 that may use the embodiments of the present invention. Depending on its configuration, the computer shown in the example of FIG. 1 may be employed as a client computer or a server computer, for example. The computer of FIG. 1 may have less or more components to meet the needs of a particular application. As shown in FIG. 1, the computer may include a processor 102, such as those from the Intel Corporation or Advanced Micro Devices, for example. The computer may have one or more buses 106 coupling its various components. The computer may include one or more input devices 104 (e.g., keyboard, mouse), a computer-readable storage medium (CRSM) 110, a CRSM reader 108 (e.g., floppy drive, CD-ROM drive), a display monitor 118 (e.g., cathode ray tube, flat panel display), a communication interface 112 (e.g., network adapter, modem) for coupling to a network 302 (shown in FIG. 3), one or more data storage devices 114 (e.g., hard disk drive, optical drive, FLASH memory), a main memory 116 (e.g., RAM) and basic input/output system (BIOS) 120. A port 124 allows external components, such as a rescue device 200, to be connected to the computer 100. In one embodiment, the port 124 comprises a USB port. A USB port is a standardized port for plugging devices to a computer.

Basic input/output system (BIOS) 120 may be stored in non-volatile memory, such as FLASH memory or ROM. If the computer 100 is based on a DOS™ operating system, the bootstrap loader 122 of the BIOS 120 may load DOS™ operating system files, such as IO.SYS, MSDOS.SYS and COMMAND.COM, from a data storage device 114 to the main memory 116. As mentioned, if one or more of these files are infected by a virus, the computer 100 may not be booted properly. The virus may also damage other files stored in a data storage device 114 or CRSM 110. If the computer 100 is based on the WINDOWS™ operating system, a bootstrap loader 122 of the BIOS 120 may load system files, such as device drivers, from a data storage device 114 to the main memory 116, where the loaded system files may be required to provide the user with an option for booting in "safe mode." As is the case with the DOS™ operating system, the WINDOWS™ operating system may not boot properly if one or more of the loaded system files are infected by a virus. It should be noted that the DOS™ and WINDOWS™ operating systems are used herein for illustration purposes only. Those of ordinary skill in the art reading the present disclosure will appreciate that embodiments of the present invention may also be employed with other operating systems.

Figure 2:
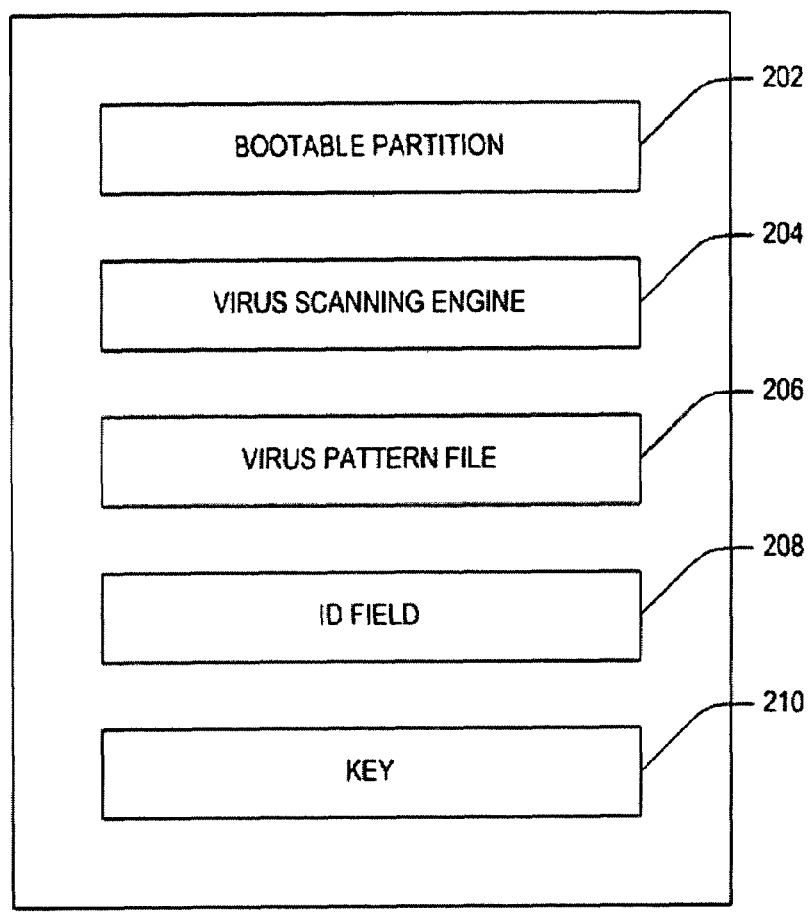
FIG. 2 shows a schematic diagram of elements implemented in a rescue device in accordance with an embodiment of the present invention.

Referring now to FIG. 2, there is shown a schematic diagram of elements implemented in a rescue device 200 in accordance with an embodiment of the present invention. As a user couples or plugs the rescue device 200 to a virus-infected computer 100, the rescue device 200 may operate as a standalone device for booting and/or scanning viruses in the computer 100. Note that the user may have to configure his or her computer's BIOS to boot off the rescue device 200.

The rescue device 200 may be preferably, but not limited to, a USB antivirus plug and scan ("PnS") device. The rescue device 200 may also be based on other types of hardware, so long as it has solid-state memory, is removable, has enough storage space, and is reusable. Unlike rescue mechanisms based on other media, such as floppy disks or optical disks, rescue device 200 provides several advantages. Firstly, it is robust and less prone to failure as it does not have any moving parts. Secondly, it may have an enhanced form factor without compromising the memory capacity required to perform the rescue process as will be explained later. The physical size of the rescue device 200 may be reduced to provide the manufacturer with easy distribution thereof and, as a consequence, users may purchase the rescue device 200 at nearby point of sales, such as convenient stores, gas stations, etc. This allows the rescue device 200 to be sold just like aspirin (i.e., analogous to the convenience of going to a pharmacy to get aspirin to cure a headache). In addition, the rescue device 200 may have a considerable amount of memory space even with a relatively small form factor so that a portion of its memory space may be reserved for additional business purposes of the manufacturer, such as an introduction to a new commercial product of the rescue device manufacturer. Thirdly, the rescue device 200 is reusable, which allows the contents of the rescue device 200 to be updated and/or upgraded. This feature is quite important as viruses are continuously evolving.

Still referring to FIG. 2, the rescue device 200 may include a bootable partition 202, virus scanning engine 204, virus pattern file 206, identification (ID) field 208 and a key 210 as a security lock for write protection. One of the major functions of rescue device 200 may be booting a virus-infected computer 100. To make the rescue device 200 operate as a standalone booting device, the bootable partition 202 may include files required for the booting process. Thus, the contents stored in the bootable partition 202 may be specific to the operating system that the rescue device 200 is designed for. For example, if the rescue device 200 is designed for a DOS™ operating system, the bootable partition 202 may include bootstrap files, such as IO.SYS, MSDOS.SYS and COMMAND.COM. Likewise, if the rescue device 200 is designed for the WINDOWS™ operating system, the bootable partition 202 may include the minimum files required for the safe mode operation.

The virus scanning engine 204 may use the virus pattern file 206 to scan the computer 100 for viruses. More specifically, the virus scanning engine 204 may use the virus pattern file 206 as a reference in determining if data, such as those stored in a data storage device 114 or memory 116, for example, contain a virus. The rescue device 200 may employ conventional virus scanning engines and pattern files.

The elements 202, 204 and 206 stored in the rescue device 200 may be updated over a network, such as the Internet. Upon completion of the update, a user may register the rescue device 200 to a vender server using identification (ID) information, such as a USB serial number, stored in the ID field 208 of the rescue device 200. Once registered, the vender server may provide proper services to the rescue device 200 in subsequent connections regardless of the type and location of the point of connection.

The key 210 may be a security lock that looks for a particular combination of code and used for write protection of the rescue device 200. The vender server may read off the key 210 from the rescue device 200 and check the validity of the key prior to allowing the user to make changes to the rescue device 200, where the changes may include proper updates and/or other information provided by the vender server.

Figure 3:
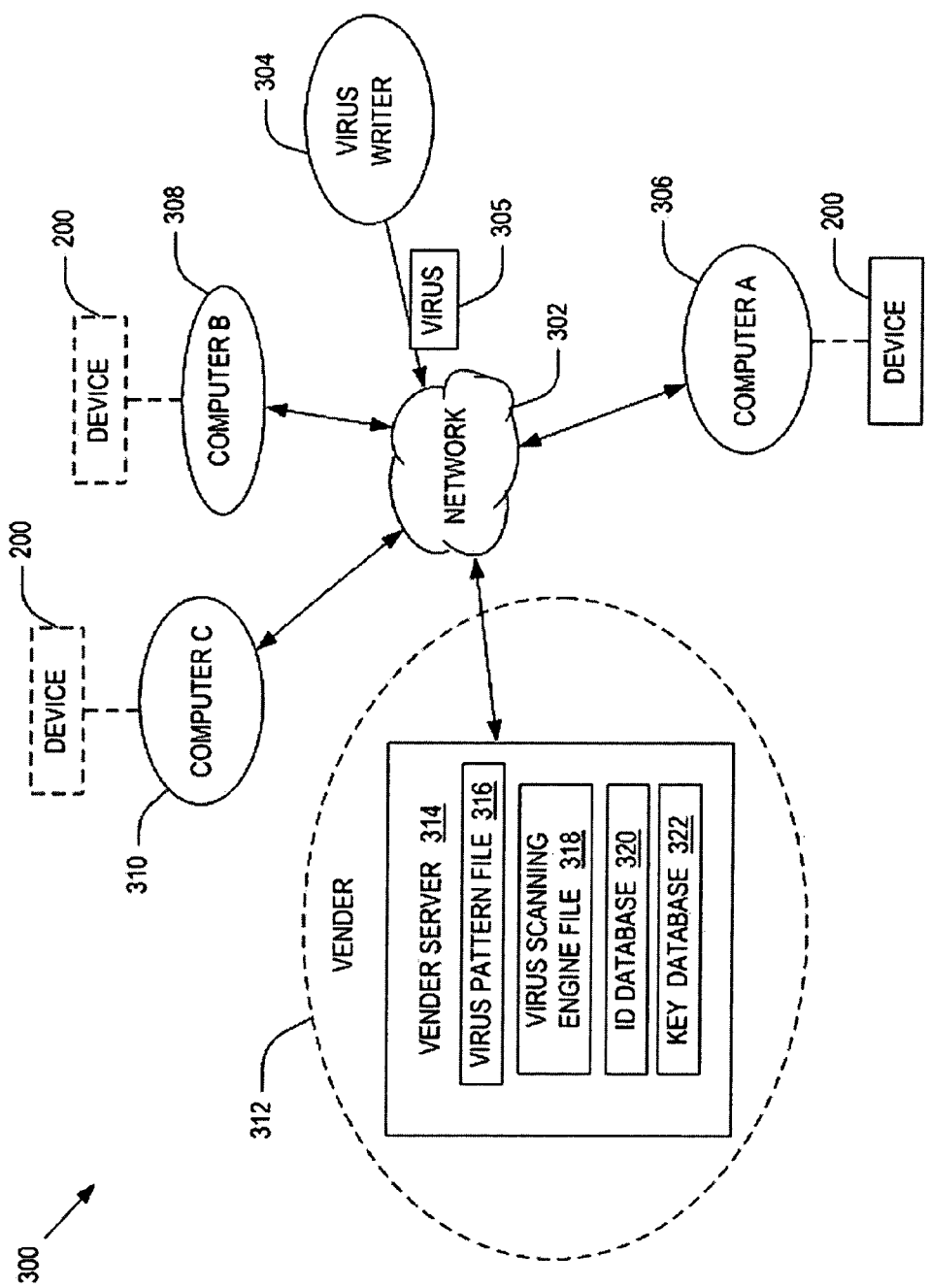
FIG. 3 schematically illustrates a system environment in accordance with an embodiment of the present invention.

Referring now to FIG. 3, there is shown a schematic diagram of a system environment 300 in accordance with an embodiment of the present invention. A virus writer 304 may transmit a virus 305 through a network 302 to computer A 306, computer B 308, computer C 310 and a vender 312. In the example of FIG. 3, only one virus writer and three computers are shown for clarity of illustration. However, it should be apparent to those of ordinary skill that the present invention can be practiced with any number of virus writers and computers. The network 302 may include the Internet or other suitable connection systems for communications.

The operating system and/or other files of the computer A 306 may be infected by the virus 305 if computer A 306 does not have a proper mechanism to protect against the virus 305. Upon infection of the operating system, a user of the computer A 306 cannot boot properly and, as a consequence, it cannot even install existing antivirus engines to remove the virus 305. In such cases, the user may couple the rescue device 200 into the port 124 (see FIG. 1) to boot the computer A 306, remove the virus 305 and patch the infected system.

If the rescue device 200 cannot boot the computer A 306, the user of the rescue device 200 may couple the rescue device 200 into a healthy (i.e., uninfected) computer B 308 (or computer C 310) to update the rescue device 200 through the network 302. Using the healthy computer B 308, the user may communicate with a vender 312 of the rescue device 200 to update the rescue device 200. The vender 312 may have at least one vender server 314 that includes a virus pattern file 316, a virus scanning engine file 318, ID database 320 and security code database 322. In one embodiment, the vender 312 may broadcast the contents of the virus pattern file 316 and/or virus scanning engine file 318 to provide new antivirus tools. In another embodiment, the vender server 314 may read off a key 210 from the rescue device 200, prior to sending the update. The key 210 may function as a security lock for write protection mode of the rescue device 200 and look for a particular combination of code. The vender server 314 may check the validity of the key 210 by comparing with each of the security codes stored in the key database 322 and send the requested update to the rescue device 200 if a match is found.

Upon completion of the update, the user may uncouple the rescue device 200 from the healthy computer B 308 (or computer C 310) and couple the rescue device 200 back to the infected computer A 306 to boot the computer A 306 and remove the virus 305 therein. In one embodiment, the user may register the rescue device 200 to the ID database 320 after downloading information from the vender server 314. The vender server 314 may read off ID information from the rescue device 200, such as a serial number stored in the ID field 208, for the registration. Once registered, the user may download information from the vender server 314 in subsequent connections regardless of the type and location of point of connection. For example, as mentioned above, the user of computer A 306 may update a rescue device 200 by coupling the rescue device 200 to the computer B 308 or computer C 310. In another embodiment, the vender server 314 may use the ID information as a key 210.

As explained above, the user may need another healthy computer to update the rescue device 200 if the computer A 306 cannot boot off the rescue device 200. However, in an alternative embodiment, the bootable partition 202 of the rescue device 200 may be implemented to perform the booting process without resorting to other healthy computers. The bootable partition 202 may be implemented to bypass the startup programs of the operating system and bring up the network 302 to the user. Upon connection to the network 302, the rescue device 200 may communicate with the vender server 314 to download the update in the same manner as described above. Subsequently, the rescue device 200 may perform the virus scanning engine 204 to remove the virus 305.

Figure 4:
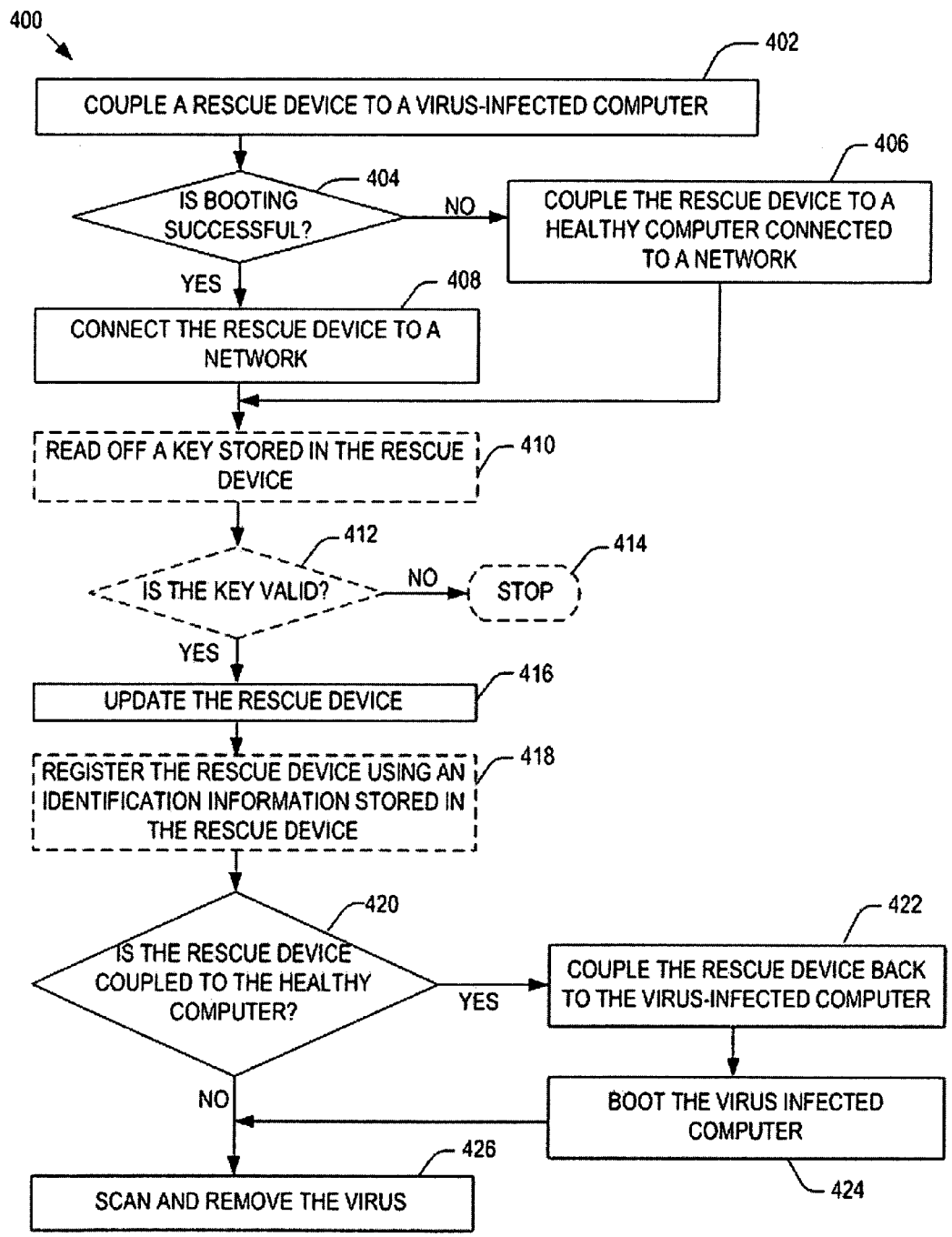
FIG. 4 shows a flow diagram illustrating exemplary steps of a rescue device in accordance with an embodiment of the present invention.

FIG. 4 is a flowchart 400 illustrating exemplary steps of a rescue device in accordance with an embodiment of the present invention. As illustrated in FIG. 4, a rescue device 200 may be coupled to a port 124 of a computer that may have a virus-infected operating system or other files in step 402. The user may attempt to boot the infected computer using the rescue device. It may be determined if the booting is successful in step 404. If answer to the decision diamond 404 is NO, the rescue device 200 may be decoupled from the virus-infected computer and coupled to a port 124 of a healthy computer that may be connected to a network 302 in step 406. Otherwise, the rescue device 200 may be connected to the network 302 using the virus-infected computer in step 408. Upon connection to the network 302, the rescue device 200 may communicate with a server that may provide information required to update the rescue device 200 and be preferably, but not limited to, a vender server 314 of the rescue device 200. For illustration purpose only, the server is assumed to be the vender server 314 in the following sections.

Upon connection to the vender server 314, the vender server 314 may take optional steps 410, 412 and 414. In one embodiment, the vender server 314 may read off a key 210 stored in the rescue device 200 in step 410. Then, the vender server 314 may check the validity of the key 210 by comparing the key 210 with each of its security codes stored in its key database 322 in step 412. If a match is not found, the key 210 may be determined to be invalid and the process may stop in step 414. Otherwise, control may proceed to step 416 to update the rescue device 200. The update may include updating the virus pattern file of the rescue device.

Upon completion of the update in step 416, the user may take an optional step 418 to register its ID information to the ID database 320 of the vender server 314. In this step, the vender server 314 may read off the ID information, such as a serial number, stored in the ID field 208 of the rescue device 200 and store it in its ID database 320. Next, it is checked whether the rescue device 200 is coupled to the healthy computer in step 420. Upon affirmative answer to step 420, the updated rescued device 200 may be decoupled from the healthy computer and coupled back to the virus-infected computer in step 422. Subsequently, the virus-infected computer may boot off the rescue device 200 in step 424. Then, the rescue device 200 may scan and remove the virus in the infected computer in step 426.

As can be appreciated, the rescue device may also be employed by booting the operating system of the infected computer from its hard drive (if possible), plugging the rescue device into a port of the infected computer, and then running the virus scanning engine of the rescue device. If necessary, the rescue device may be loaded with new virus pattern files over the Internet before scanning the infected computer for viruses. The rescue device may be updated with new virus pattern files using the network connection of the infected computer, if possible, or by plugging the rescue device to a healthy computer and using the network connection of the healthy computer.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method for scanning a computer for viruses, the method comprising:

plugging a removable rescue device into a port of a virus infected computer, the rescue device comprising a solid state memory with a scanning engine;

prior to scanning the infected computer, updating the rescue device over a network connection of the infected computer; and scanning the infected computer for viruses using the scanning engine.

2. The method of claim 1, further comprising:
registering the rescue device to a server that provides updated information to the rescue device.

3. The method of claim 2, wherein the server is a server of a vendor of the rescue device.

4. The method of claim 2, wherein registering the rescue device comprises:
reading off an identification information stored in the rescue device; and
storing the identification information in the server.

5. The method of claim 4, wherein the identification information comprises a serial number of the rescue device.

6. The method of claim 1, wherein the network includes the Internet.

7. The method of claim 1, further comprising, prior to updating the rescue device:
reading off a key stored in the rescue device; and
checking if the key is valid.

8. The method of claim 7, wherein checking if the key is valid comprises:
comparing the key with security codes stored in a server that provides updated information to the rescue device.

9. The method of claim 8, wherein the information includes at least one virus scanning engine, at least one virus pattern file, or both.

10. A removable rescue device including a solid-state memory for storing computer-readable program code, the rescue device comprising:
a bootable partition for booting a computer;
a virus scanning engine;
an identification (ID) field for storing ID information of the rescue device, wherein a user registers the rescue device to a server with the ID information; and
a virus pattern file;
wherein the rescue device is configured to communicate with the server through a network, the server containing information for updating a content of the rescue device.

11. The removable rescue device of claim 10, wherein the ID information is a serial number of the rescue device.

12. A method for scanning a computer for viruses, the method comprising:
prior to plugging a removable rescue device into a port of a virus infected computer, plugging the rescue device into a port of a healthy computer, the healthy computer not infected with a virus, and updating the rescue device over a network connection of the healthy computer;
plugging the rescue device into the port of the infected computer, the rescue device comprising a solid state memory with a scanning engine; and
scanning the infected computer for viruses using the scanning engine.

13. A removable rescue device including a solid-state memory for storing computer-readable program code, the rescue device comprising:
a bootable partition for booting a computer;
a virus scanning engine;
a key for controlling a write protection mode, wherein a server reads off the key and checks a validity of the key prior to allowing the rescue device to be updated and a virus pattern file;
wherein the rescue device is configured to communicate with the server through a network, the server containing information for updating a content of the rescue device.

* * * * *